United States Patent Office 3,417,047
Patented Dec. 17, 1968

3,417,047
ROOM TEMPERATURE VULCANIZING ORGANO-POLYSILOXANE COMPOSITION
Dietrich Golitz, Cologne-Stammheim, Klaus Damm, Cologne-Flittard, Richard Muller, Leverkusen, and Walter Noll, Opladen, Germany, assignors to Farbenfabriken Bayer Aktiengesellschaft, Leverkusen, Germany, a corporation of Germany
No Drawing. Filed Jan. 26, 1965, Ser. No. 428,209
Claims priority, application Germany, Feb. 6, 1964,
F 41,926
12 Claims. (Cl. 260—37)

ABSTRACT OF THE DISCLOSURE

Organo-polysiloxane compositions are disclosed which are capable of being plastically shaped and which are storable in the absence of water and are convertible into the solid elastic state in the presence of water including the humidity of the atmosphere at a temperature of from room to 50° C. The compositions comprise:
(1) a base siloxane of the formula:

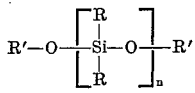

wherein $n$ has a value of at last 1, R' is hydrogen or alkyl ($C_{1-4}$) and R' is hydrogen, alkyl, alkenyl or aryl, with at least half of the R groups being methyl, and
(2) an organo-silicon cross-linking agent having the formula

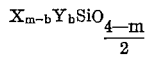

wherein X is hydrogen, alkyl or aryl, $m$ is at least 1 but does not exceed 4, $b$ has a positive value equal to at least 3 substituents Y per molecule of organisilicon compound and Y is a Si—N bonded carboxylic acid amide radical i.e., either

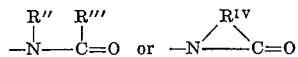

wherein R" is alkyl or aryl, R''' is hydrogen, alkyl or aryl and R$^{IV}$ is alkylene or alkarylene.

---

The invention relates to plastically shapable organo-polysiloxane compositions containing specified cross-linking agents, which are converted into the solid elastic state at below 50° C.

A number of processes are known, in which vulcanizable diorgano siloxane polymers are immediately converted into elastomers by admixing cross-linking components without the application of heat. For this purpose, at least two preliminary mixtures must be kept in store and these must be mixed with one another in specified proportions at the location of use shortly before being employed. Since the cross-linking reaction starts immediately, the disadvantage of a time limitation for application is obvious. Moreover, these systems contain organo metal compounds, chiefly dialkyl tin carboxylates or lead salts, which are toxic and whose comparatively high proportion in the elastic end product generally results in the thermal stability being reduced as the metal content increases.

Mixtures are also known, which are prepared, with the exclusion of water, completely at the location of production, stored in tight containers and, when removed from the containers, react under the influence of water including the humidity of the atmosphere, to form elastomers. Materials of this type contain, in addition to the convertible organo-polysiloxane and fillers, either alkoxysilicon compounds and an organic metal compound, or alkyl-tri-acyloxy silanes. In the first case some of the mentioned disadvantages still exist, in the other case the hydrolysis initiating the cross-linking liberates carboxylic acid which has corrosive properties and a depolymerizing effect on the organo-polysiloxane if heated, and which involves substantial inconvenience due to odour, especially if the most commonly used methyl triacetoxy silane splitting off acetic acid is employed.

It has now been found that the stated disadvantages are avoided by using specific N-silyl-substituted carboxylic acid amides, instead of the known cross-linking agents. The organo-polysiloxane compositions according to the invention, which are converted into the solid elastic state at below 50° C. especially at room temperature, in the presence of water which may act in the liquid or vaporous form including atmospheric humidity, are mixtures of (1) an organo-siloxane as base siloxane which substantially corresponds to the general formula

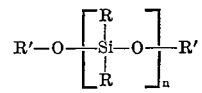

in which $n$ is an integer greater than 1, R' is a hydrogen atom or an alkyl radical of at most 4 carbon atoms, and each R is a hydrogen atom or an alkyl, alkenyl or aryl radical, at least half of all these radicals R being methyl, and which, in addition to its R$_2$SiO units may also contain up to 10 mol percent of siloxane units of the formula RSiO$_{3/2}$, and (2) an organo-silicon compound acting as cross-linking agent which may be diluted with an inert organic solvent, and which corresponds to the general formula

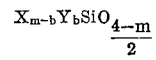

where in each X is a hydrogen atom or an alkyl or aryl radical including indifferently substituted alkyl or aryl, $m$ has a value of more than 1 and at most 4, $b$, has a positive value adequate to at least 3 substituents Y per molecule of the said organo-silicon compound, and Y is an Si—N bonded carboxylic acid amide radical of the formula

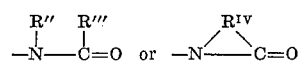

wherein R" is an alkyl or aryl radical including indifferently substituted alkyl or aryl, R''' is a hydrogen atom or an alkyl or aryl radical including indifferently substituted alkyl or aryl, R$^{IV}$ is an alkylene or alkarylene radical including indifferently substituted alkylene or alkarylene. Optionally, there may be further admixed usual fillers and, according to the explanations given below, up to 10 percent by weight, referred to the base siloxane, of α,ω-bis-(trimethyl-siloxy)-polydimethyl siloxane, or up to 50 percent by weight, referred to the base siloxane, of a methyl polysiloxane consisting of (CH$_3$)$_3$SiO$_{1/2}$ and SiO$_2$ units in a molar ratio of between 1:1 and 1:2.

The N-silyl-substituted carboxylic acid amides (2) to be used according to the invention, having the characteristic atom sequence

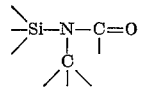

comprise therefore organo-silanes of the formula XSiY$_3$ and SiY$_4$ in case that $m$ is 4, and organo-siloxanes in case that $m$ is less than 4, i.e. 3 or less. They are obtained, for example, from a silane of the formula XSi(Halogen)$_3$ or a tetrahalosilane, or from halogen-substituted organosiloxanes by the reaction with a carboxylic acid amide of the formula

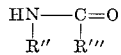

or with a lactam

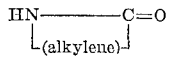

or with oxindole

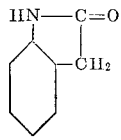

or phthalimidine

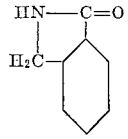

at temperatures up to 80° C., in the presence of an acid-binding agent, pyridine or a trialkylamine being suitable for this purpose. These reactions can also be carried out in an inert solvent, e.g. an aliphatic or aromatic hydrocarbon or ether.

The halogen-substituted organo-siloxanes used for this purpose, which must contain at least 3 Si-bonded halogen atoms per molecule, are obtained in known manner, for example by an incomplete hydrolysis of halosilane mixtures which contain, on average, at least 1 and less than 3 Si-bonded halogen atoms and to whose individual silicon atoms 1 to 4 halogen atoms are bonded. The chlorine content and the proportion of the individual silanes determines the degree of polymerization. This degree may be as high as desired and is only limited by the difficulty of dosing and admixing the cross-linking agent according to the invention due to the increasing viscosity. Consequently the cross-linking agent preferably consists of less than 100 siloxane units and can also be applied diluted with an inert organic solvent.

In principle the proportion of this cross-linking agent in the convertible organo-polysiloxane compositions may be very high, but it has a decisive influence on the elasticity of the vulcanization product. In general, it therefore amounts to not more than 60 percent by weight of the base siloxane.

The alkyl, alkenyl, and aryl radicals R of the organo-siloxanes (1) used as base are in the simplest cases methyl, vinyl and phenyl, respectively. These organosiloxanes are obtained in known manner by hydrolysis with water and subsequent condensation from chloro- or alkoxy-silanes which are selected according to the structure of the siloxane units in the desired organo-siloxane. Another known method is the polymerization of cyclic and linear organosiloxanes by means of alkaline or acidic catalysts including the so-called Lewis acids, leading, possibly after washing out or inactivating the catalyst with water, to compounds with terminal SiOH groups or, if the polymerization is carried out after admixing alkoxy-silanes or -siloxanes, to compounds with terminal alkoxysilyl groups. If it is desired to obtain especially hard vulcanization products, up to 10 molar percent of siloxane units of the formula $RSiO_{3/2}$ can be introduced, in known manner, into the base siloxane either by incorporating them during polymerization or by admixing them in the form of polymers which predominantly consist of these groups. The degree of polymerization of the base siloxanes may vary within wide limits ranging from disiloxane to polysiloxanes of several million centistokes viscosity at 20° C., i.e. which can be assumed to contain several ten thousand of units.

The organo-polysiloxane compositions may contain the known active and inactive fillers, for example chalk, talc, kieselguhr, silica, silica gel, quartz powder, titanium dioxide, iron oxides, zirconium silicate, calcium sulphate, aluminum oxide, magnesium oxide, carbon black, graphite, sand and the known finely divided fillers based on silicon dioxide, whose surface may also be modified by alkyl-silyl or alkoxy-silyl groups. The proportion of the fillers generally amounts to less than 50 percent by weight of the total composition.

The $\alpha,\omega$ - bis - (trimethylsiloxy)-polydimethyl siloxanes which can be admixed to the compositions in a quantity of up to 10 percent by weight of the base siloxane, are commercial oils of viscosities between 100 and several hundred thousand centistokes at 20° C. This admixture has the effect that softer vulcanization products are obtained than without such oil additive and that the products of vulcanization of which is completed in molds or on other surfaces do not adhere to these molding substrates.

If on the other hand, adhesive power is desired to use the material as an adhesive, there may be admixed in known manner a resinous methyl polysiloxane consisting of units of the formula $(CR_3)_3SiO^{1/2}$ and the same to twice the number of units of the formula $SiO_2$, in a quantity of up to 50 percent by weight of the base siloxane.

Except for the addition of the acylamide derivative used as cross-linking agent, which is usually added as the last component to the main mixture, the sequence in which the components are mixed is optional. If anhydrous conditions are not provided in this main mixture, the cross-linking agent according to the invention can be admixed only shortly before the molding or any other application of the initially still plastic composition, since the vulcanization sets in immediately.

In those cases where the composition is to be completed from the first with all its components to be ready for use, it is necessary to keep it free from water. This can be achieved in various ways: the individual components can be carefully dried and then mixed with the exclusion of moisture but it is also possible to prepare first the main mixture without a particularly careful drying and then either to dehydrate it completely in the hot, optionally also in a vacuum, or to add a drying agent which does not interfere with the subsequent cross-linking. If the water content of the mixture is low, a small portion of the cross-linking agent according to the invention itself may serve as drying agent. Since the vulcanization is thereby anticipated to a small extent, care must then be taken by choosing the viscosity of the organo-siloxane component used as base sufficiently low as not to render the subsequent molding of the plastic compositions, prior to its final vulcanization, too difficult. Obviously, the cross-linking agent itself or its solution must always be protected, also during admixing, from any kind of water access. A mixture is thus obtained which can be stored if tightly sealed, and which, after removal from the container for application, is immediately molded without any further admixture, its vulcanization being initiated by the access of atmospheric humidity or also by moistening with water.

The compositions produced according to the invention which are stored in the form of the finished mixture, or separately in the form of the main mixture and the cross-linking agent, can be used for a number of known purposes. With suitable fillers they can be used, for example, for the production of rubber-elastic articles or for embedding parts of electrical appliances for the purpose of insulation or protection from heat, dirt or mechanical damage. It is also possible to prepare with these compositions in known manner dispersions which are used for coating fabrics.

In the following specific descriptions and examples which are given for the purpose of illustrating the invention, the parts are parts by weight. Four organo-silicon compounds substituted with carboxylic acid amide are first described, which are designated as cross-linking agents A, B, C and D.

Cross-linking agent A

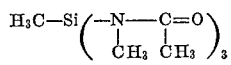

70 parts of triethylamine are slowly added dropwise, while stirring, to a solution of 45 parts of N-methyl acetamide and 30 parts of methyl trichlorosilane in 400 parts of toluene, and the reaction mixture is then stirred for a further 15 minutes. The precipitated triethyl ammonium chloride is separated by filtration with the exclusion of moisture and by washing twice with 100 parts of toluene each time. From the combined filtrates the solvent is distilled off in a vacuum at 5 mm. Hg. There remains a red oil of the above structure.

Cross-linking agent B

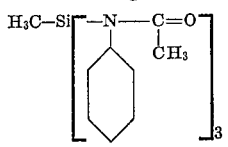

85 parts of acetanilide are dissolved at 35° C. in a mixture of 200 parts of acetonitrile and 200 parts of toluene 30 parts of methyl trichlorosilane are added to the resultant solution and dry trimethylamine is subsequently introduced with stirring, until the solution is saturated. The temperature thereby rises to about 50° C., and trimethyl ammonium chloride precipitates. 250 parts of the solvent are then removed from the reaction mixture in a vacuum, and the salt precipitate and the filtrate are further treated as described for cross-linking agent A. A viscous yellow oil of the above structure results.

Cross-linking agent C

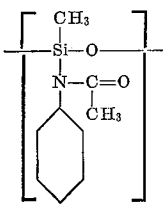

A mixture of 45 parts of water and 400 parts of tetrahydrofuran is added dropwise at room temperature, while stirring, to 450 parts of methyl trichlorosilane. The solvent is then removed from the mixture by heating to 50° C. in a vacuum of 13 mm Hg. After determination of the chlorine content, the equivalent weight of the remaining somewhat turbid oil, is calculated at approximately 95, corresponding to the structure ClSi(CH$_3$)O.

110 parts of this oil and 155 parts of acetanilide are dissolved at 70° C. in 500 parts of toluene, and 120 parts of triethylamine are slowly added to the solution. The temperature thereby rises to 80° C. and triethylammonium chloride precipitates. When the suspension has cooled, the salt precipitate and the filtrate are treated as described for cross-linking agent A, and a polysiloxane essentially consisting of units of the above formula is obtained in the form of a turbid, highly viscous oil.

Cross-linking agent D

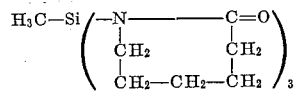

65 parts of triethylamine are slowly added dropwise to a solution of 70 parts of ε-caprolactam and 30 parts of methyl trichlorosilane in 400 parts of toluene. The temperature of the reaction mixture thereby rises to 50° C. and triethyl ammonium chloride precipitates. After cooling of the mixture, the salt precipitate and the filtrates are treated as described for cross-linking agent A, a pale red oil of the above structure being obtained.

The four acylamide derivatives described above react hydrolytically under the action of water, with re-formation of the carboxylic acid amide used for their production, and with condensation yielding a gel of the empirical formula (CH$_3$Si)$_2$O$_3$. In the following examples of carrying out the process according to the invention they are used as cross-linking agents.

EXAMPLE 1

In one series, batches of 100 parts of an α,ω-dihydroxy-polydimethyl siloxane of 20,000 centistokes viscosity at 20° C., prepared in known manner from octamethyl cyclotetrasiloxane with 0.005 percent by weight of potassium hydroxide by polymerization at 130° C., are first mixed with the exclusion of moisture, with 1.5 percent by weight of cross-linking agent A, 1.5 percent by weight of cross-linking agent B, 3 percent by weight of cross-linking agent C, 3 percent by weight of cross-linking agent D, and a layer 1 cm. high of each of the four mixtures thus obtained is poured into open glass vessels where they are exposed to atmospheric air. The vulcanization of the polysiloxane layers starts from the surface and reaches the bottom after about 40 hours.

In a second series, twice the amount of the four cross-linking agents is used, the procedure being otherwise exactly the same as before. In these layers, the vulcanization is completed after about 30 minutes. In all eight cases a resilient organo-polysiloxane block results, which is no longer tacky.

EXAMPLE 2

An organo-polysiloxane is used which is obtained in the following manner: dry nitrogen is blown for 90 minutes at 100° C. through 2300 g. of octamethyl cyclotetrasiloxane, the mixture is then heated to 150° C., 3.45 g. of tetravinyl tetramethyl cyclotetrasiloxane, 0.77 g. of diphenyl diethoxy silane and 0.1 g. of potassium hydroxide are added thereto and heating is continued at 150° C. for 7 hours. A highly viscous α,ω-diethoxy-polydiorgano-siloxane is then obtained, whose penetrometer value is 2430, corresponding to a viscosity of several million centistokes at 20° C.

Three batches each of 100 parts of this polysiloxane are dissolved in 100 parts of toluene, 4 parts of one of the cross-linking agents A, B and C is admixed to each of these solutions, a layer about 3 mm. high of each of the three solutions is poured into open glass vessels, and they are thus exposed to the action of the atmospheric air. After about 12 hours, the vulcanization of the layers is completed with formation of rubber-elastic organo-polysiloxane plates.

EXAMPLE 3

50 parts of an α,ω-dihydroxy-polydimethyl siloxane of 3000 centistokes viscosity at 20° C., prepared in known manner from octamethyl cyclotetrasiloxane by polymerization with the use of bleaching earth, are kneaded with 30 parts of a finely divided zirconium silicate known under the trade name of "Zirkosil" and dried at 120° C., and 20 parts of diatomaceous earth having the trade name of "Celite Super Floss" and dried in the same way. Finally, 1.2 parts of cross-linking agent A are admixed, and the composition thus obtained, which is ready for use, is sealed air-tight. It is then storable for a prolonged time without noticeable increase in viscosity. When spread in air as a layer 1 cm. high, it is converted with continuing cross-linking into a rubber-elastic molded piece in the course of about 30 minutes.

EXAMPLE 4

30 parts of the same α,ω-dihydroxy-polydimethyl siloxane as described in Example 3 are dissolved in 70 parts of xylene, and 1 part of cross-linking agent C is added thereto. The solution thus obtained is storable for a prolonged time if moisture is excluded. If a cotton fabric is impregnated with the solution and then allowed to dry in air, vulcanization of the organo-polysiloxanes initiated by atmospheric humidity takes place, besides evaporation of the solvent which may be accelerated by gentle heating, e.g. to 50° C. A fabric is obtained, which is provided with an elastic siloxane coating.

EXAMPLE 5

An organo-polysiloxane composition is used, which is obtained in the following way: 1200 g. of octamethyl cyclotetrasiloxane are heated with 0.05 g. of potassium hydroxide at 150° C. until the resultant polymer has reached a viscosity of 1000 centistokes. At this temperature, 180 g. of octaphenyl cyclotetrasiloxane are then slowly added and a temperature of 150° C. is maintained, the reaction mixture becoming clear and homogeneous in the course of about one hour. In the polydiphenyl dimethyl siloxane thus obtained there are dissolved, still at 150° C., 600 g. of a resinous methyl polysiloxane which consists of $(CH_3)_3SiO_{1/2}$ and $SiO_2$ units in a molar ratio of 4:5 and which can be produced, for example, according to U.S. Patent No. 2,814,601, Example 1. 33 parts of cross-linking agent A are admixed to 1000 parts of the main mixture of linear and resinous cross-linked polysiloxanes thus obtained, and the composition is poured out to form a 1 cm. high layer which is allowed to be converted in the open air. A polysiloxane block with resilient properties is formed within about 10 hours.

What we claim is:

1. An organo-polysiloxane composition capable of being plastically shaped and which is storable under exclusion of water and convertible into the solid elastic state in the presence of water, including atmospheric humidity, at a temperature of from room to 50° C., comprising:
   (1) a base siloxane having the formula

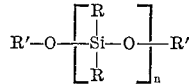

wherein $n$ is an integer number and has a value of at least 1, R' is a member selected from the group consisting of hydrogen and alkyl of not more than 4 carbon atoms, each R is a member selected from the group consisting of hydrogen, alkyl, alkenyl and aryl, at least half of said R groups being methyl, and
   (2) a cross-linking agent comprising an organo-silicon compound having the formula $$X_{m-b}Y_bSiO_{\frac{4-m}{2}}$$

wherein each X is selected from the group consisting of hydrogen, alkyl and aryl, $m$ has a value of at least 1 and maximally 4, $b$ has a positive value equal to at least three substituents Y per molecule of said organosilicon compound, and Y is a Si—N bonded carboxylic acid amide radical selected from the group consisting of

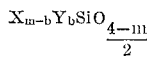

wherein R'' is selected from the group consisting of alkyl and aryl, R''' is selected from the group consisting of hydrogen, alkyl and aryl, and R$^{IV}$ is selected from the group consisting of alkylene and alkarylene.

2. A composition according to claim 1 wherein the base siloxane (1) comprises siloxane units of the formula

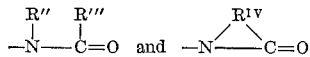

and said base siloxane has an additional content of up to 10 mol percent of siloxane units of the formula

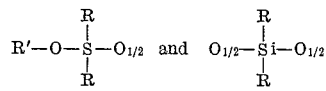

wherein R and R' have the foregoing significance.

3. A composition according to claim 1 wherein said cross-linking agent (2) is utilized diluted with an inert organic solvent.

4. A composition according to claim 1 wherein said organo polysiloxane composition is admixed with a filler selected from the group consisting of chalk, talc, kieselguhr, silica, silica gel, quartz powder, titanium dioxide, iron oxides, zirconium silicate, calcium sulphate, aluminum oxide, magnesium oxide, carbon black, graphite, sand, and finely divided fillers based on silicon dioxide modified by alkylation of its surface.

5. A composition according to claim 4 wherein said filler is utilized in amount equal to less than 50 percent by weight of the total composition.

6. A composition according to claim 1 admixed with up to 10 percent by weight of the base siloxane (1) of alpha, ω-bis-(trimethylsiloxy)-polydimethyl siloxane having a viscosity of from 100 to 200,000 centistokes at 20° C.

7. A composition according to claim 1 admixed with up to 50 percent by weight of the base siloxane (1) of a methyl polysiloxane composed of $(CH_3)_3SiO_{1/2}$ and $SiO_2$ units in a molar ratio of between 1:1 to 1:2.

8. A composition according to claim 1 wherein said cross-linking agent (2) is an N-silyl-substituted carboxylic acid amide containing the group

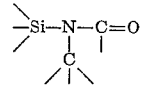

9. A composition according to claim 1 wherein said cross-linking agent (2) is an organosilane selected from the group consisting of $XSiY_3$ and $SiY_4$.

10. A composition according to claim 1 wherein said cross-linking agent (2) is an organosiloxane.

11. A composition according to claim 1 wherein said cross-linking agent (2) is present in an amount of up to 60 percent by weight of the base siloxane (1).

12. A composition according to claim 1 wherein said cross-linking agent is a member selected from the group consisting of compounds of the formula

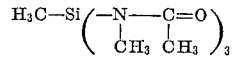

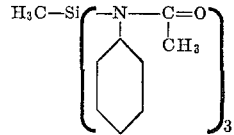

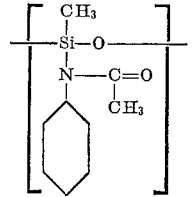

and

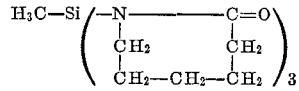

References Cited

UNITED STATES PATENTS

| | | | |
|---|---|---|---|
| 2,876,234 | 3/1959 | Hurwitz | 260—326.5 |
| 2,902,468 | 9/1959 | Fianu | 260—46.5 |
| 2,938,010 | 5/1960 | Bluestein | 260—46.5 |
| 3,032,528 | 5/1962 | Nitzsche et al. | 260—46.5 |

ALLAN LIEBERMAN, *Primary Examiner.*

J. E. CALLAGHAN, *Assistant Examiner.*

U.S. Cl. X.R.

260—46.5, 448.2